(12) United States Patent
Abi-Saleh

(10) Patent No.: US 6,438,712 B1
(45) Date of Patent: Aug. 20, 2002

(54) QUICK IDENTIFICATION OF DEFECT-UNCOVERING FILES

(75) Inventor: Hanna Abi-Saleh, Cambridge, MA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/169,210

(22) Filed: Oct. 9, 1998

(51) Int. Cl.[7] .................. H02H 3/05; H03K 19/003; H04B 1/74

(52) U.S. Cl. .................. 714/38; 714/21; 714/25; 714/39

(58) Field of Search .................. 714/38, 21, 25, 714/39, 42, 48, 49; 717/4, 9

(56) References Cited

U.S. PATENT DOCUMENTS

| | | | | |
|---|---|---|---|---|
| 4,831,517 A | * | 5/1989 | Crouse et al. | 364/200 |
| 5,533,192 A | * | 7/1996 | Hawley et al. | 395/183.04 |
| 6,031,991 A | * | 2/2000 | Hirayama | 395/704 |
| 6,148,417 A | * | 11/2000 | Da Silva | 714/25 |
| 6,205,561 B1 | * | 3/2001 | Santerre et al. | 714/36 |

* cited by examiner

*Primary Examiner*—Peter Wong
*Assistant Examiner*—Tim Vo
(74) *Attorney, Agent, or Firm*—Lahive & Cockfield, LLP

(57) ABSTRACT

The location of a bug resulting from processing a sequence of input files is determined by generating a potentially smaller sequence of the files which result in the bug. Such files can include data, instruction, or both. The smaller sequence can be determined by excluding portions from the sequence, and or returning portions to the sequence, and testing the sequence to determine if it results in the bug. In one embodiment of the present invention, excluded and returned portions become successively smaller by about a quotient of two. In another embodiment, individual files are excluded from a sequence of files, preferably in reverse order to their appearance in the sequence of files. The resulting sequence is tested to determine if it results in the bug. If not, the file can be returned to the sequence, and the bug location method continued with another file of the sequence.

23 Claims, 6 Drawing Sheets

QUICK IDENTIFICATION OF DEFECT-UNCOVERING FILES

BACKGROUND OF THE INVENTION

1. Field of the Invention

The present invention pertains to the field of software correction. More particularly, the present invention pertains to locating bugs using a list of files (a "batch" file) which makes up an input stream for a processor.

2. Description of the Related Art

A common problem encountered in the field of computer engineering is the occurrence of bugs in a part of a computer system, whether hardware or software. For purposes of discussion here, the emphasis will be on software, although it may be applicable to bugs in hardware as well. As used herein, software means information of any kind that can be processed by a processor, and may include data, instructions, or both; and a bug means a portion of software, or an interaction between portions of software, which cause a processor which processes the software to yield erroneous results or to malfunction.

One type of bug which is particularly difficult to locate occurs while processing batch files. When a batch file is processed in sequence, a bug may be witnessed while a particular file (witnessing file) is being processed, but be caused by some processing of predecessor files. Processing of a predecessor file may, for example, cause the witnessing file to crash by allowing data to be overwritten at memory addresses allocated to the witnessing file. Thus, the witnessing file may crash even if it would be properly processed by itself.

Identifying such bugs by conventional means is very difficult. Exhaustive testing is highly impractical because bug frequency typically increases at about an exponential rate relative to the amount of software under scrutiny. Further, conventional tools for locating bugs typically test an individual program, or a set of linked programs, and usually are not well suited at identifying bugs resulting from processing of batch files. To locate a bug, the computer user must search through a lengthy sequence of files, many of which are not involved in causing the bug. This is cumbersome and time consuming even for skilled programmers, and requires significant programming expertise.

There is thus a continuing need in the area of computer engineering for an improved tool which locates and identifies bugs resulting from processing of batch files. Applicability of such tools to identifying such bugs resulting from a batch of print files is highly desired. Such tools preferably should yield a minimal boundary range or minimal list of files for each bug.

SUMMARY OF THE INVENTION

A bug location system and method are presented according to the present invention for identifying one or more bugs resulting from a plurality of files. In a preferred mode of operation, the files comprise an input stream for a printer, and the bugs comprise printing bugs which cause the printer to malfunction when the files are printed. However, the bug location system and method are generally applicable to various types of bugs which may be encountered on various computer or processor platforms.

According to one aspect of the present invention, a printer emulator is implemented as a software program which is run on a processor. Several data structures are used with the printer emulator which allow the processor to implement the bug location method in accordance with the present invention. The processor on which the printer emulator and data structures operate preferably is the central processing unit (CPU) of a general purpose computer or the processing unit of a printer.

According to another aspect of the present invention, a given sequence of files results in a bug, and the bug location system and method determine a smaller sequence of these files which results in the same bug. Bugs are identified as being the same in these sequences according to various indicators. One such indicator is that both sequences crash on the same line of code during processing of a of a particular witnessing file when run with the same options. A further or alternative indicator comprises both sequences having substantially identical core dump traces upon crash or other failure. In accordance with the present invention, the bug is considered to be the same even though some or all of the files not in the smaller sequence of files might contribute to anomalies when the larger sequence of files is processed. This beneficially aids in identifying bugs to sufficient extent that they can be quickly corrected.

According to another aspect of the present invention, a given sequence of files results in a bug, and the bug location system and method determine a smaller sequence of these files that results in the bug and that includes all files of the given sequence between the first and last file of the smaller sequence. Preferably if files are excluded from the beginning or end of this smaller sequence, then the resulting sequence will not result in the bug. Such a sequence is referred to as a minimal boundary range for the bug. When the given sequence is already a minimal boundary range for the bug, then the determined sequence typically will be this minimal boundary range.

According to another aspect of the present invention, a given sequence of files results in a bug and the bug location system and method determine a smaller sequence of the files that result in the bug and that cannot be any smaller. That is, if any files are excluded from this sequence, then the resulting sequence will not result in the bug. Such a sequence is referred to as a minimal list for the bug. When the given sequence is already a minimal list for the bug, then the determined sequence typically will be this minimal list. To speed up convergence on a minimal list for the bug, the given sequence is expected to be a minimal boundary range for the bug, and may be obtained using the bug location method as described above.

According to another aspect of the present invention, the bug location system and method locate a bug resulting from a sequence of files according to the following steps. The bug location method selects and excludes a portion of the files from the sequence of files. The bug location method then determines whether the sequence results in the bug. If not, the bug location method returns a portion of the excluded files to the sequence, and the sequence of files is then tested to determine if it results in the bug. This is repeated until the sequence results in the bug.

According to another aspect of the present invention, if a portion of the files in such a sequence are selected and excluded, and the sequence still results in the bug, additional portions of files in the sequence are iteratively excluded until the sequence no longer results in the bug or no more files can be excluded. At that point, the excluded files are returned to the sequence until the sequence again results in the bug. These steps are repeated as desired to further reduce the length of the sequence. Where the last file of the sequence witnesses the bug, files preferably are excluded from the beginning of the sequence. About half of the files preferably are excluded from the sequence during the first excluding step. About half as many files preferably are returned during each returning step as were either excluded or returned in the most recent step which is either an excluding step or a returning step. Except for a first excluding step, preferably about half as many files are excluded during each excluding step as were either excluded or returned in the most recent step which is either an excluding step or a returning step. Rapid binary convergence on a minimal boundary range for the bug is thus provided.

According to another aspect of the present invention, the bug location method locates a bug caused by processing a sequence of files according to the following steps. The bug location method selects and excludes a file from the sequence, and then determines whether the bug results from the sequence. If not, the file is returned to the sequence. These steps preferably are repeated until a minimal list for the bug is obtained. Very rapid convergence on a minimal list for the bug is achieved by performing the bug location method on an original sequence in the binary conversion sense described above to determine a minimal boundary range for the bug, and then performing the bug location method on the minimal boundary range excluding a single file during each excluding step to determine a minimal list for the bug. Where the bug location method is applied to a minimal boundary range for the bug, preferably each file other than the witnessing file and first file is selected in turn.

According to another aspect of the present invention, the step of selecting a file to exclude from the sequence comprises selecting a next to last file of the sequence a first time that this step is performed, and then selecting a file immediately preceding a current selected file each succeeding time that this step is performed. This preferably is repeated until all but the first file of the sequence have been selected.

According to another aspect of the present invention, the bug location system is implemented on a computer. A data structure capable of directing the computer to perform the bug location method is stored in a computer readable medium, such as a hard disk drive, which the computer reads and processes, and in response thereto, performs the bug location method in accordance with the present invention.

The bug location system and method according to the present invention beneficially determine a minimal boundary range and minimal list for a bug. This simplifies the generally difficult task of identifying a bug resulting from processing of a large sequence of files. The bug location system and method exclude from consideration files not required for the bug to occur. This helps to distinguish what causes the bug, which can prove valuable in determining how the printer or printer emulator might be modified to correct or avoid the bug when processing the files. The second bug location method (i.e., the one determining a minimal list) operates in second order polynomial time with respect to the number of files under test. As the number of files is increased, time expended by the present invention to identify bugs resulting from processing of such files increases at most as a second order polynomial function of the number of files under test. The present invention thus is not as limited by the slow down encountered in conventional bug location systems.

The features and advantages described in the specification are not all-inclusive, and particularly, many additional features and advantages will be apparent to one of ordinary skill in the art in view of the drawings, specification, and claims thereof. Moreover, it should be noted that the language used in the specification has been selected principally for readability and instructional purposes, and may not have been selected to delineate or circumscribe the inventive subject matter, resort to the claims being necessary to determine such inventive subject matter.

DETAILED DESCRIPTION OF THE INVENTION

The present invention comprises a bug location system and method which locates one or more bugs resulting from processing of a plurality of files. The bug location system and method are believed to be generally applicable to locating bugs resulting from batch files, and particularly beneficial for locating and correcting bugs resulting from batch print files. In a preferred mode of operation, the files comprise an input stream for a printer and the bugs comprise printing bugs which would cause the printer to yield erroneous results or malfunction when printing.

According to the present invention, a given sequence of files uncovers a bug, and the bug location system and method determine a smaller sequence of these files that results in the bug and that includes all files of the given sequence between the first and last file of the smaller sequence. Preferably if files are excluded from the beginning or end of this smaller sequence, the resulting sequence will not result in the bug. Such a sequence is referred to as a minimal boundary range for the bug.

In a preferred mode of operation, the bug in the given sequence is witnessed in the last file of the given sequence when the given sequence is processed in order, for example, by the processing unit of a computer or printer. In such preferred mode of operation, if the given sequence comprises $[f_1, f_2, f_3, f_4, f_5, f_6, f_7]$ and the smaller sequence begins with file $f_3$, then the smaller sequence is given as $[f_3, f_4, f_5, f_6, f_7]$. Further, if the smaller sequence $[f_3, f_4, f_5, f_6, f_7]$ is a minimal boundary range for the bug, then the bug is not caused in $[f_3]$, nor in $[f_3, f_4]$, nor in $[f_7]$; but it might be in $[f_3, f_7]$, or in $[f_3, f_5, f_7]$, or in $[f_3, f_4, f_6, f_7]$, and it is definitely in minimal boundary range $[f_3, f_4, f_5, f_6, f_7]$ for the bug.

According to another aspect of the present invention, a given sequence of files has a bug, and the bug location system and method determine a smaller sequence of these files that result in the bug and that cannot be any smaller. That is, if any files are excluded from the determined sequence, then it will not result in the bug. Such a sequence is referred to as a minimal list for the bug. Thus, if the given sequence is a minimal boundary range $[f_3, f_4, f_5, f_6, f_7]$ for the bug, then some possible minimal lists are sequences [$f_3$, $f_7$], [$f_3$, $f_4$, $f_7$], [$f_3$, $f_5$, $f_7$], [$f_3$, $f_4$, $f_6$, $f_7$], and [$f_3$, $f_4$, $f_5$, $f_6$, $f_7$]. When the given sequence at input is a minimal list for the bug, then the determined sequence typically will be this minimal list. To speed up convergence on a minimal list for the bug, the given sequence is a minimal boundary range for the bug, such as one obtained via the bug location method described above.

Figure 1A:
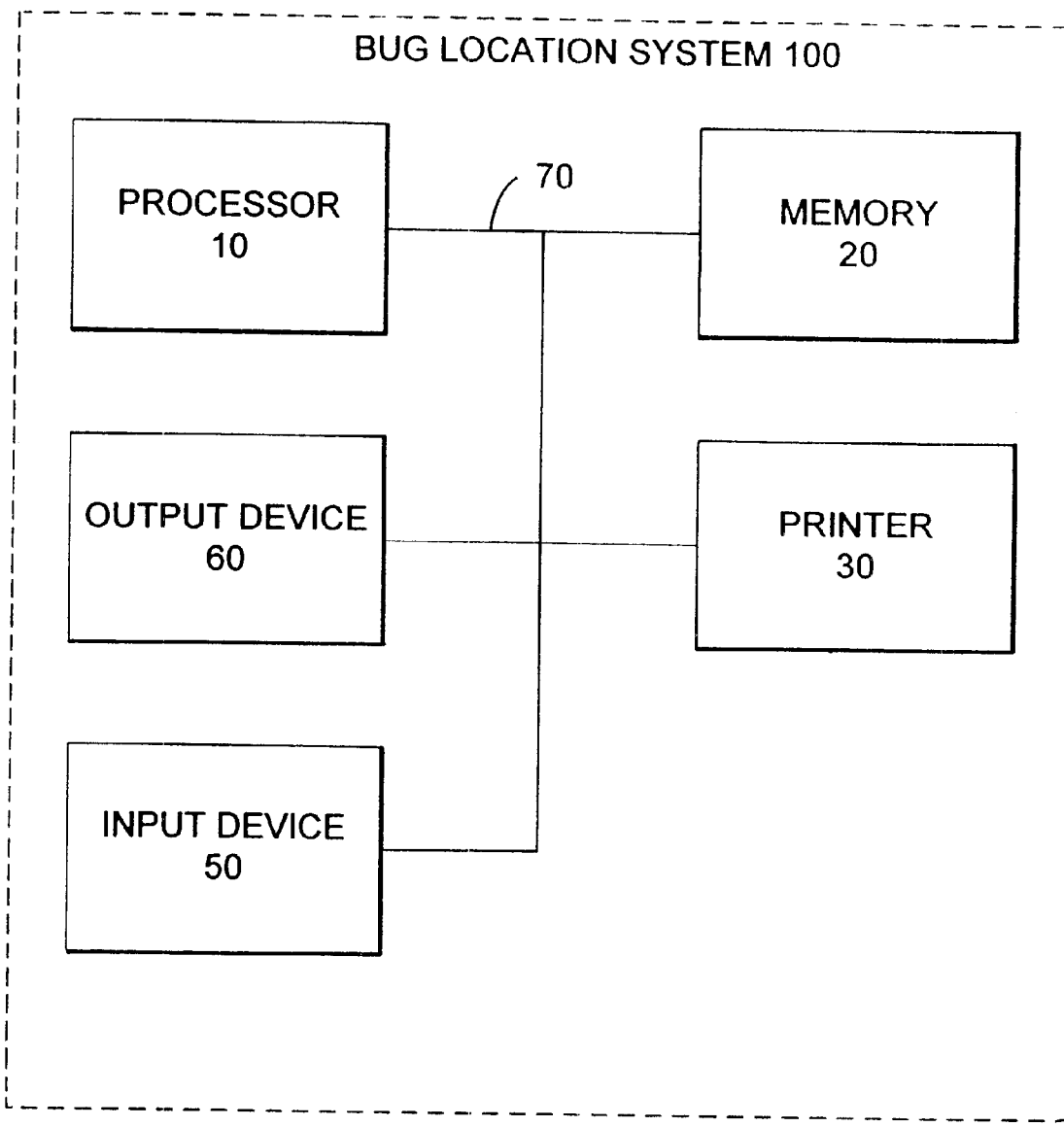
FIG. 1A is a block diagram of a first embodiment of a bug location system according to the present invention that includes a processor and a memory, and which operates in an environment that includes an input device, an output device, a printer, and an interconnecting bus.

Referring now to FIG. 1A, there is shown an embodiment of the bug location system 100 according to the present invention. Bug location system 100 comprises a processor 10 and a memory 20, and operates in an environment that includes a printer 30, an input device 50, and an output device 60, interconnected in conventional manner by a multi-bit bus 70. The processor 10 can be any general purpose processor such as the PENTIUM®, PENTIUM II®, or other INTEL x86® compatible central processing unit (CPU). Such INTEL x86® compatible CPU's are commercially available from several manufacturers including INTEL CORPORATION of Santa Clara, Calif. The memory 20 can be any information storage device capable of storing information which can be read by the processor 10, such as a hard disk drive, compact disk (CD) drive, or digital versatile disk (DVD) drive. The memory 20 preferably is a computer readable medium readable by the processor 10. The printer 30 can be of conventional design which is capable of printing sequences of files. The printer 30 preferably includes a processing unit and memory unit therefor. The input and output devices 50, 60 can be of conventional designs, such as a conventional keyboard and cathode ray tube (CRT) monitor respectively. Numerous varieties of processor 10, memory 20, input device 50, output device 60, and bus 70 can be used in accordance with the present invention, as will be apparent to those skilled in the art.

The memory 20 stores various data structures, code, etc. (collectively, "data structures"), such as an operating system, which are read and processed by the processor 10 to allow the processor 10 to provide conventional data processing functionality. The memory 20 further stores first, second, and third sets of data structures for implementing the bug location method of the present invention. It is noted that the various data structures can alternatively be stored in more than one memory device, such as dedicated memory devices for each set of data structures, as will be apparent to those skilled in the art.

In accordance with the present invention, the first set of data structures comprises a printer emulator program which when run on the processor 10 emulates the printer 30 in accordance with the present invention. Preferably the printer emulator receives both a sequence of files and various option signals as input. The option signals indicate desired print resolution, desired spool location, and memory amount allowed. The printer emulator processes the files and generates one or more corresponding image representations. The printer emulator also determines if the sequence of files would cause the printer 30 to yield erroneous results or malfunction (i.e., would result in a bug). For each such bug, the printer emulator receives a sequence of files which uncovers the bug. This sequence of files ends with a file which witnesses the bug during emulation. Once such a witnessing file is determined, the printer emulator is reset by the testing environment. Consequently, each received sequence uncovers a bug independent of other bugs uncovered by other sequences.

In accordance with the present invention, the second set of data structures comprises a software process which when run on the processor 10 implements a first bug location method of the present invention. This implementation of the first bug location method receives a sequence of files which results in a bug. The bug is witnessed in the last file of the sequence when the sequence is processed in ascending order, for example, by the processing unit of printer 30 or by the printer emulator as implemented by processor 10. The first bug location method determines an output sequence which is believed to comprise a minimal boundary range for the same bug.

In accordance with the present invention, the third set of data structures comprises a software process which when run on the processor 10 implements a second bug location method of the present invention. This implementation of the second bug location method receives a sequence of files which results in a bug. The bug preferably is witnessed in the last file of the received sequence when the received sequence is processed in ascending order, for example, by the processing unit of the printer 30, or by the printer emulator as implemented by processor 10. The second bug location method determines an output sequence which is believed to comprise a minimal list which results in the same bug as the received sequence. For fastest convergence on such minimal list, the received sequence is a minimal boundary range for the bug.

The first, second, and third sets of data structures are inter-linked so that the print emulator testing process can supply an appropriately formatted sequence of files to the first bug location method, which in turn supplies a minimal boundary range for a bug to the second bug location method, which determines a minimal list for the bug. In this manner, the bug is located during emulation and corrected prior to actual printing of the files by the printer 30.

Figure 1B:
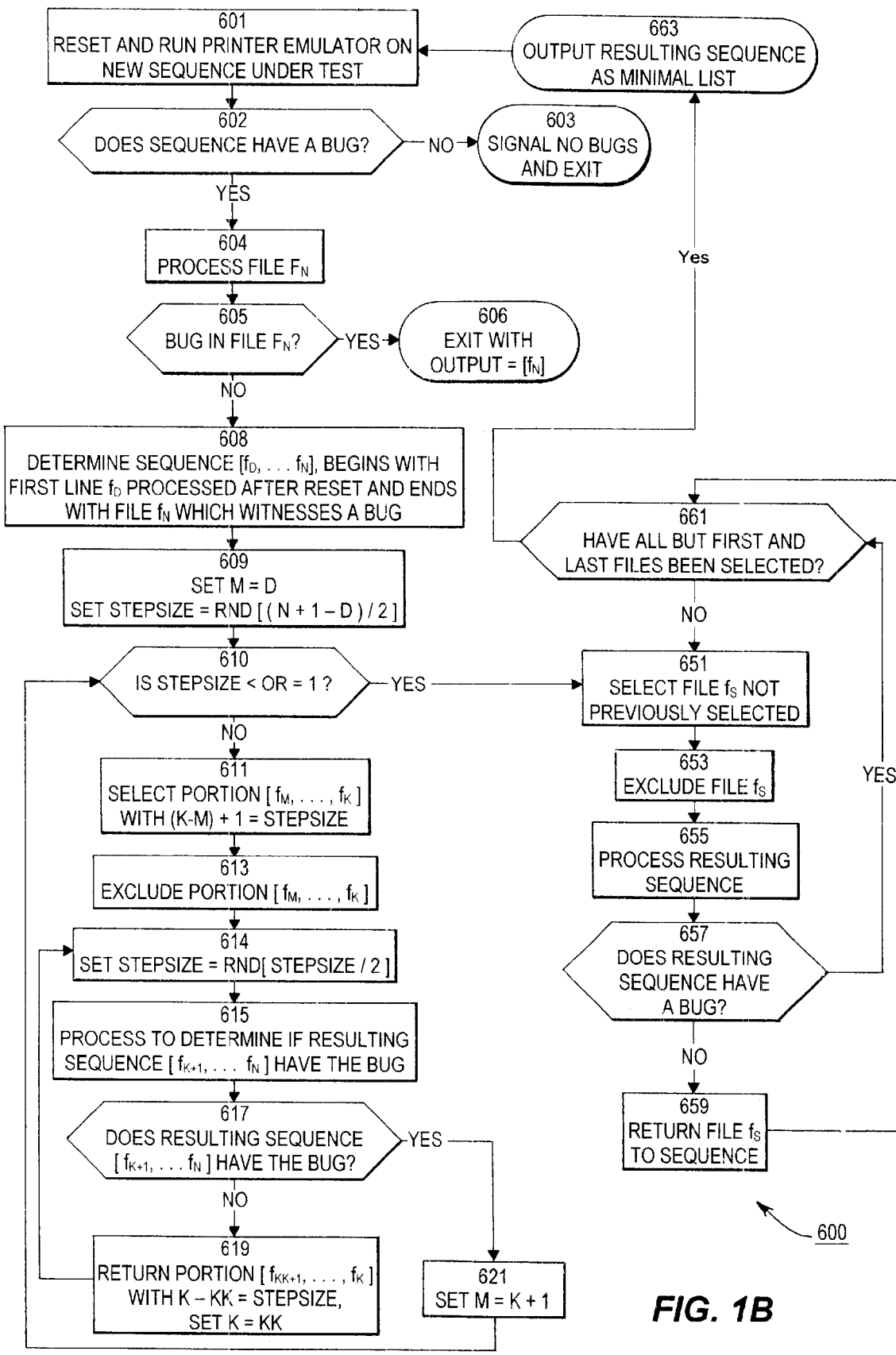
FIG. 1B is a flow-chart of embodiments of the first and second bug location methods according to the present invention as performed by the bug location system illustrated in FIG. 1A.

Referring now also to FIG. 1B, there is shown a flow-chart chart of an embodiment of the bug location method 600 according to the present invention as performed on bug location system 100. A sequence [$f_1$, $f_2$, ..., $f_A$] of files are prepared by the processor 10 as an input stream for the printer emulator. These files may comprise a batch file of printer language programs. Such printer languages include POSTSCRIPT 3® which is commercially available from ADOBE SYSTEMS, INCORPORATED. When sent to the printer, such files typically would be interpreted and corresponding print data printed. Such print data may include, for example, raster images, fonts, vector graphic images, black and white images, and color images, as well as combinations of such images. Such files can be generated in a variety of ways. For example, such files can be generated by drivers present in the WINDOWS 95® operating system commercially available from MICROSOFT CORPORATION of Redmond, Wash.

The processor 10 reads the printer emulator from memory 20. Virtual operating characteristics of the printer emulator are reset, and the printer emulator is run 601 by the processor 10 to emulate printer 30. First bug location method 201 is then run, as described in greater detail in connection with FIG. 2 below. A check 602 is then made to see if the result of such processing 201 is a single witnessing file $f_N$ (as described below), in which case processing reverts to 601. Othwerwise, control is passed to step 651. The processor 10 reads the third set of data structures from memory 20, and runs it to perform an embodiment of the second bug location method according to the present invention. This locates a subsequence of [$f_M$, ..., $f_N$] that results in the same bug, but which is as small as possible.

This embodiment of the second bug location method selects 651 a file $f_S$ from the sequence which has not previously been selected. The file $f_S$ is excluded 653 from the sequence. The resulting sequence is processed 655 by the printer emulator after reset to determine 657 if it results in the bug. If so, bug location method 600 proceeds to step 661. If not, the excluded file $f_S$ is returned 659 to the sequence, and bug location method 600 then proceeds to step 661.

In step 661, the bug location method 600 determines whether all but the first file $f_M$ and last file $f_N$ of the sequence $[f_M, f_{M+1}, \ldots, f_N]$ received from step 610 has yet been selected. If not, bug location method 600 continues with step 651. If so, bug location method 600 outputs 663 the resulting sequence, which is believed to be a minimal list for the bug. This embodiment of the bug location method 600 can then terminate. Alternatively, bug location method 600 can return to step 601 so that any new sequence $[f_1, f_2, \ldots, f_A]$ can be processed.

The output of bug location method 600 greatly expedites correction of the bug. Correction may beneficially take various forms. For example, the output sequence of files can be examined by a software developer to determine why the bug occurs so that it can be corrected. By reducing the number of files that need to be considered to determine the cause of the bug, the present invention substantially reduces the expected time for correcting the bug. Further, because the files of the output sequence typically are each needed for the bug to occur, the cause of the bug beneficially may be suggested by relationships between the files of the minimal list for the bug.

Figure 2A:
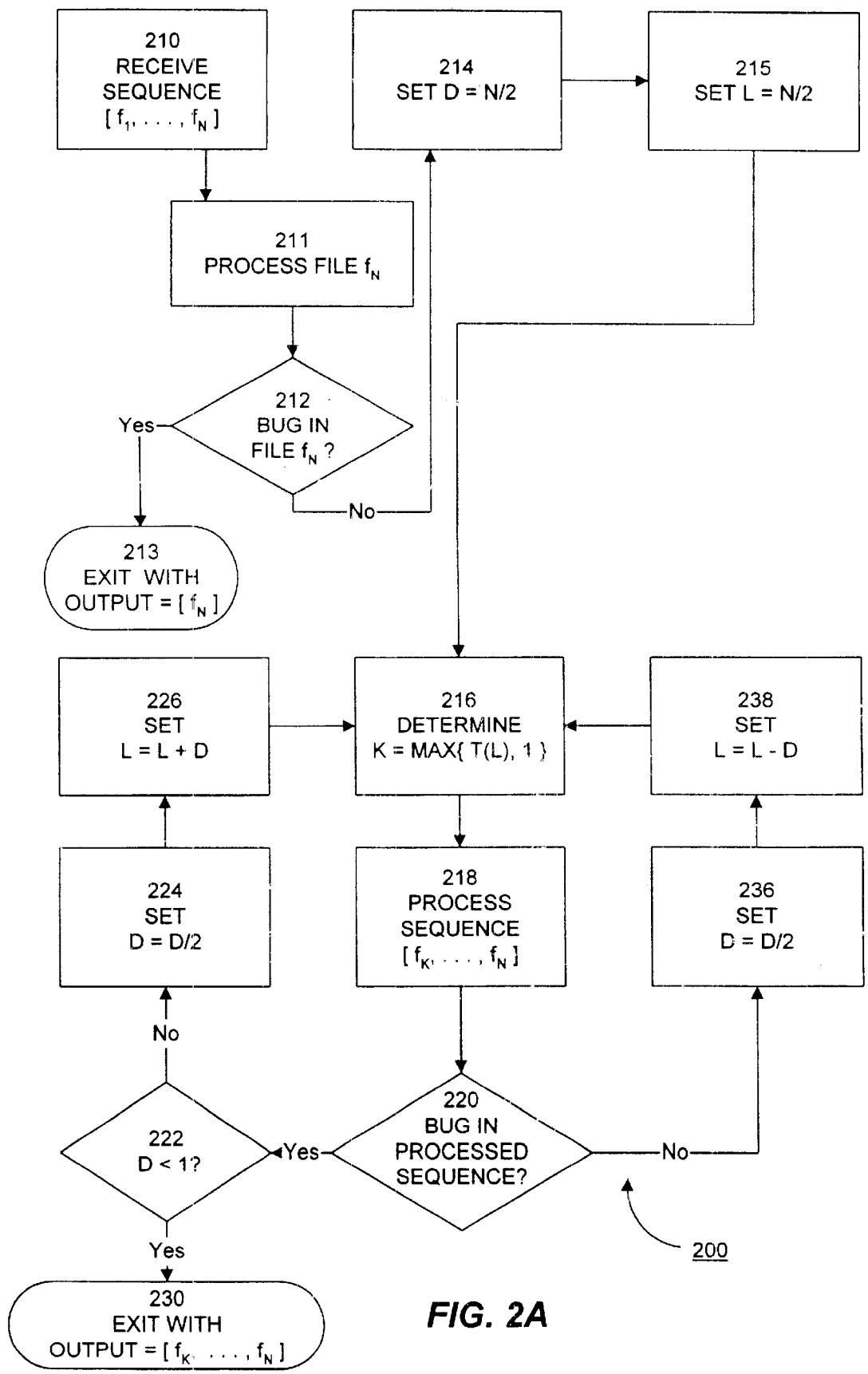
FIG. 2 is a flow chart of an embodiment of the first bug location method according to the present invention.
Figure 2B:
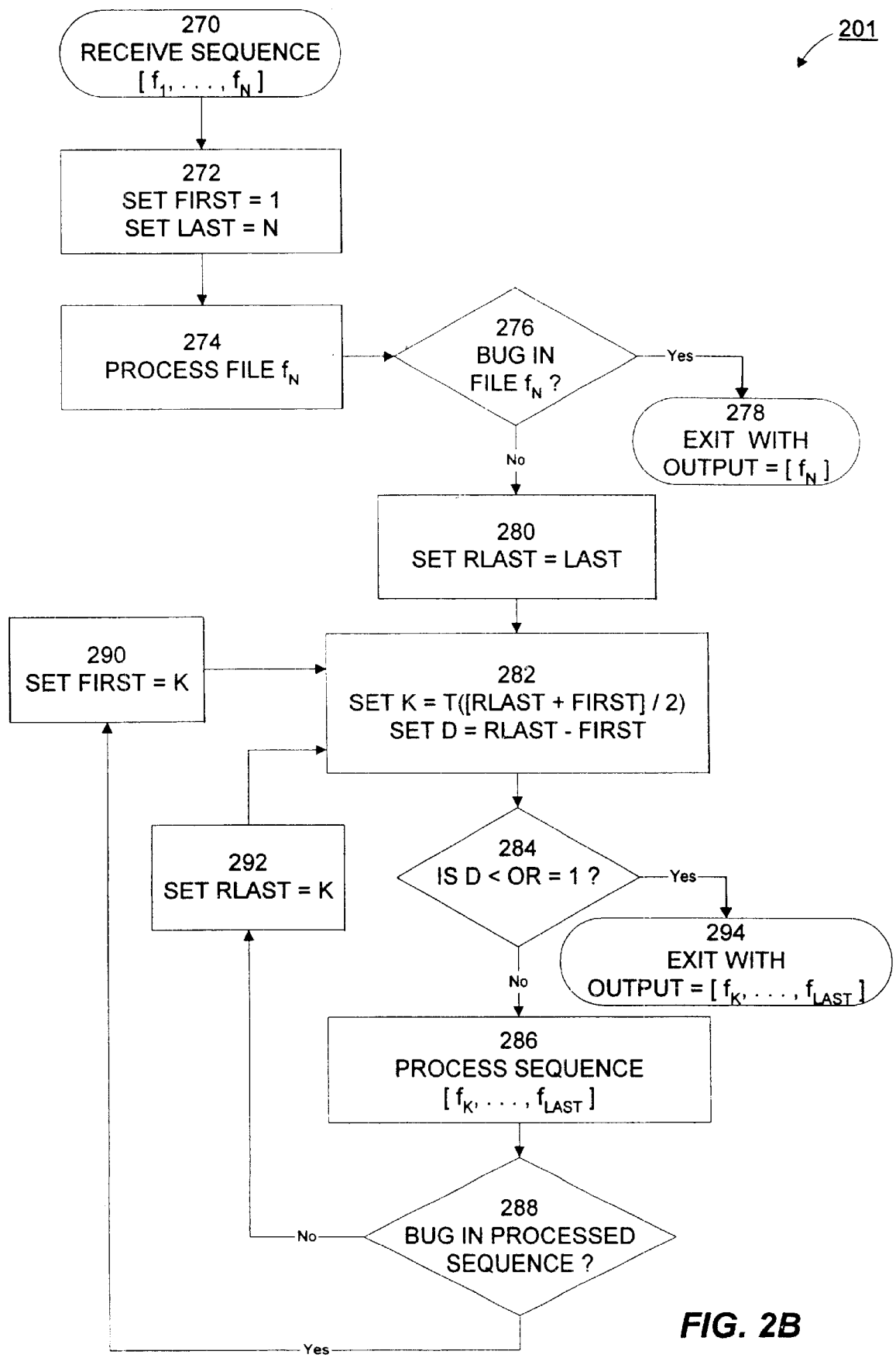

Referring now also to FIG. 2, there is shown a flow chart of an embodiment of the first bug location method 201 according to the present invention. In step 270, bug location system 100 receives a sequence $[f_{KK}, \ldots, f_N]$ of files which is believed to result in a single bug. In step 272, the processor 10 sets variables FIRST=KK and LAST=N. The processor 10 processes after reset 274 the last file $f_N$ of the sequence $[f_{KK}, \ldots, f_N]$ to determine 276 whether the file $f_N$ results in the bug by itself. If so, first bug location method 201 is exited 278 with minimal boundary range (mbr) given as mbr=$[f_N]$.

If it is determined 276 that file $f_N$ does not result in the bug by itself, then the processor 10 sets 280 a variable RLAST=LAST. The processor 10 next sets 282 two variables K and D according to K=T([RLAST+FIRST]/2) and D=RLAST-FIRST. Here, T([RLAST+FIRST]/2) means ([RLAST+FIRST]/2) truncated to the next lowest integer value. The processor 10 then determines 284 whether D$\leq$1. If D$\leq$1 in step 284, the first bug location method 201 outputs 294 sequence $[f_K, \ldots, f_{LAST}]$, which is believed to be a minimal boundary range for the bug, and first bug location method 201 is exited. If D is not $\leq$1 in step 284, the processor 10 processes 286 the sequence $[f_K, \ldots, f_{LAST}]$ after resetting printer emulator to determine 288 whether it has the bug. If so, the processor 10 sets 290 FIRST=K, and the first bug location method 201 returns to step 282. If not, the processor 10 sets 292 RLAST=K, and the first bug location method 201 returns to step 282.

In this embodiment of the first bug location method 201, a loop is formed beginning at step 282 and traversing steps 284, 286, 288 and either 290 or 292 back to step 282. First bug location method 201 eventually exits this loop by determining in step 284 that D is $\leq$1. This can occur the first time that step 284 is performed. It is noted that on each pass through the loop, K is set to approximately the midpoint of an interval [FIRST, . . . , RLAST], and if the loop does not terminate in that pass, then near the end of the loop either FIRST or RLAST is set equal to K. After a sufficient number of passes through the loop, the length D of the interval [FIRST, . . . , RLAST ] is eventually $\leq$1, and thus the loop is eventually exited.

Figure 3A:
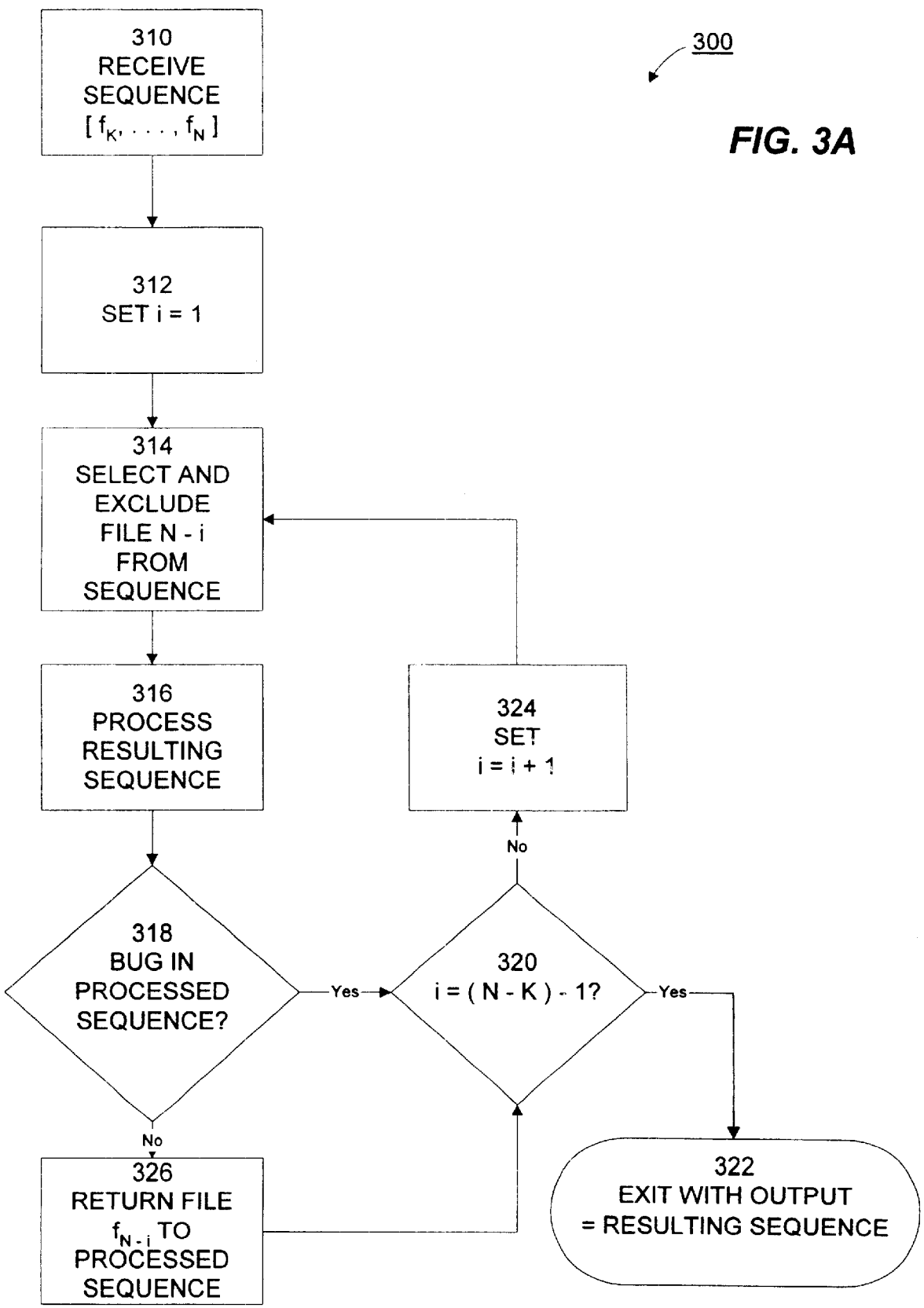
FIG. 3A is a flow-chart of an embodiment of the second bug location method according to the present invention.

Referring now also to FIG. 3A, there is shown a flow chart of an alternative embodiment of the second bug location method 300 of the present invention. In this embodiment, the processor 10 receives 310 a sequence $[f_K, \ldots, f_N]$ which preferably is a minimal boundary range such as the output of the first embodiment of the first bug location method. The processor 10 sets 312 a variable i=1. The processor 10 then selects and excludes 314 the file N−i from the received sequence $[f_K, \ldots, f_N]$, and resets printer emulator, then processes 316 the resulting sequence to determine 318 whether it has the bug.

If in step 318 the bug is in the resulting sequence, then the processor determines 320 whether i=(N−K)−1, because if i=(N−K)−1, then all files except N and K have been excluded to determine whether they are needed for the bug to occur. If i=(N−K)−1, the processor exits 322 the second bug location method 300 and outputs the resulting sequence. This output sequence is believed to comprise a minimal list ml of the files of $[f_K, \ldots, f_N]$ which results in the bug. If in step 320, variable i does not equal (N−K)−1, the processor 10 sets 324 i=i+1, and then proceeds to step 314.

In step 318, if the bug did not result from the processed sequence, the processor 10 returns 326 the file $f_{N-i}$ to the processed sequence. This is done because this file $f_{N-i}$ is apparently needed for the bug to occur. Once the file $f_{N-i}$ is returned 326, the processor 10 continues with step 320. Note that steps 314, 316, 318, 320, 324, 326 form a loop which excludes a file that may not be needed for the bug to occur, determines whether the bug occurs without such file, and returns the file if it is needed.

Second bug location method 300 is believed to operate in second order polynomial time with respect to the number of files T=(N−K)+1 in the received sequence $[f_K, \ldots f_N]$. For example, each time a file is excluded 314 from the sequence, the resulting sequence contains less than T files, and hence the processor 10 processes less than T files in occurrence of step 316. Further, step 316 occurs T−2 times each time that bug location method 300 is employed. Thus, this embodiment of second bug location method 300 requires that the processor 10 process at most on the order of $T^2$ files each time that the bug location method 300 is employed. For large values of T, this is very fast compared to the conventional bug location method of testing all possible combinations of files to determine a minimal list.

Figure 3B:
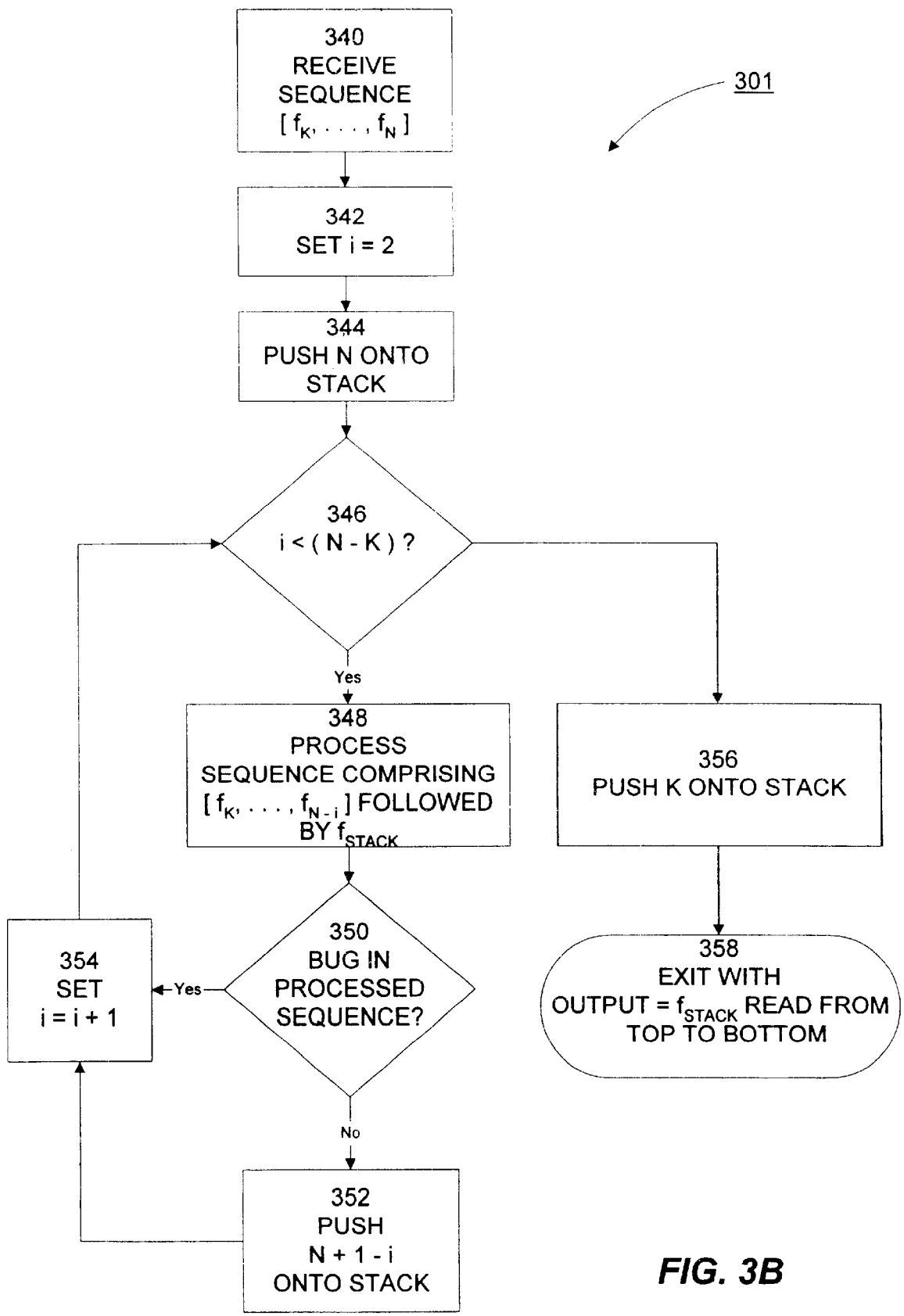
FIG. 3B is a flow-chart of an alternative embodiment of the second bug location method according to the present invention.

Referring now also to FIG. 3B, there is shown a flow chart illustrating another alternative embodiment of the second bug location method 301 in accordance with the present invention. In second bug location method 301, file representations are pushed onto a stack if needed starting with witnessing file $f_N$ and ending with the first file of the sequence, $f_K$.

Second bug location method 301 proceeds as follows. In step 340 the processor 10 receives a sequence $[f_K, \ldots, f_N]$ which preferably comprises a minimal boundary range mbr. The processor 10 then sets 342 a variable i=2, and begins the stack by pushing 344 index N onto the stack, where N is the index of witnessing file $f_N$. The processor 10 then determines 346 whether i$\leq$(N−K). In response to determining 346 that i$\leq$(N−K), the processor 10 resets printer emulator, then . . . processes 348 the sequence of files $[f_K, \ldots, f_{N-i}, f_{stack}]$ comprising the sequence $[f_K, \ldots, f_N-i]$ followed by files $f_e$, where e comprises the elements of the stack ranging from the top to the bottom of the stack. Note that this excludes the file $f_{N+1-i}$. The processor 10 then determines 350 whether sequence $[f_K, \ldots, f_{N-i}, f_{stack}]$ results in the bug. If sequence $[f_K, \ldots, f_{N-i}, f_{stack}]$ does not result in the bug, the processor 10 pushes 352 index N+1−i onto the stack, sets 354 i=i+1, and proceeds to step 346. However, if the processor 10 determines 350 that sequence $[f_K, \ldots, f_{N-i}, f_{stack}]$ results in the bug, the processor 10 sets 354 i=i+1 without pushing index N+1−i onto the stack, and then proceeds to step 346.

The described steps include a loop traversing steps 346, 348, 350, possibly 352, 354, and back to 346. Note that eventually i>(N−K) in step 346. When so, the processor 10 exits the loop, and pushes 356 index K onto the stack. File $f_K$ is the beginning file of the minimal boundary range mbr=$[f_K, \ldots, f_N]$ for the bug, and is believed typically to be needed in a minimal list for the bug. Finally, this embodiment of the second bug location method 301 is exited 358 with an output sequence being $f_{stack}$. That is, the output sequence comprises those files indexed by the elements of the stack read from the top to the bottom of the stack, where $f_N$ is stored at the bottom of the stack and $f_K$ is stored at the top of the stack. This output sequence is believed to be a minimal list for the bug.

The above description and accompanying figures are included to disclose the structure and operation of various preferred embodiments of the present invention and are not meant to limit the scope of the present invention. From the above description and accompanying figures, many variations to the present invention will be apparent to those skilled in the relevant art. These and other such variations are encompassed by the present invention, which is limited only by the following claims.

What is claimed is:

1. A bug location method for locating a bug resulting from processing of a sequence of files, said bug location method comprising the steps of:
   a) selecting a next to last file in the sequence during an initial selection and selecting a file immediately preceding a current selected file during a subsequent selection;
   b) excluding the selected file from the sequence;
   c) determining whether without the selected file the sequence results in the bug; and
   d) returning the file to the sequence in response to determining that without the selected file the sequence does not result in the bug.

2. The bug location method of claim 1, wherein step a) is repeated until all but a first file of the sequence has been selected.

3. A bug location method of locating a bug in a sequence of files, said bug location method comprising the steps of:
   a) selecting a portion of the files in the sequence;
   b) excluding said portion of the files from the sequence;
   c) determining after step b) whether the sequence results in the bug;
   d) in response to determining that the sequence does not result in the bug, returning a portion of excluded files to the sequence;
   e) determining, after returning the portion in step d), whether the sequence results in the bug; and
   f) repeating step d) followed by step e) until determining in step e) that the sequence results in the bug.

4. The bug location method of claim 3, further comprising repeating steps a), b), and c) until determining in step c) that the sequence does not result in the bug.

5. The bug location method of claim 3, wherein the portion of files excluded in step a) includes about half of the files of the sequence.

6. The bug location method of claim 3, wherein the portion of excluded files returned in a first performance of step d) includes about half of the files excluded from the sequence in step b).

7. The bug location method of claim 3, wherein the portion of excluded files returned to the sequence in a repeat performance of step f) includes about half as many files as the portion of excluded files returned in a preceding performance of step f).

8. The bug location method of claim 3, further comprising repeating steps a), b), and c) in succession a plurality of times, in response to the sequence still resulting in the bug, until only a single file is excluded from the sequence during step b).

9. The bug location method of claim 3, wherein step b) further comprises excluding the files from a beginning of the sequence.

10. The bug location method of claim 3, further comprising:
   g) selecting a file in the sequence;
   h) excluding the selected file from the sequence;
   i) determining whether without the selected file the sequence results in the bug; and
   j) returning the file to the sequence in response to determining in step i) that the sequence does not result in the bug.

11. A data structure embodied in a tangible medium and capable of being read by a computer and capable of directing said computer to perform the bug location method of claim 3.

12. The bug location method of claim 10, further comprising repeatedly performing steps g), h), i), and j), with the file selected during each succeeding performance of step g) comprising a predecessor of a file selected in a preceding performance of step g).

13. The bug location method of claim 10, further comprising repeatedly performing steps g), h), i), and j), with the file selected during each succeeding performance of step g) comprising an immediate predecessor of the file selected in an immediately preceding performance of step g).

14. A bug location method of locating a bug in a sequence of files, said bug location method comprising the steps of:
   a) selecting a portion of the files in the sequence;
   b) excluding said portion of the files from the sequence;
   c) determining after step b) whether the sequence results in the bug;
   d) in response to determining that the sequence does not result in the bug, returning a portion of excluded files to the sequence;
   e) determining, after returning the portion in step d), whether the sequence results in the bug;
   f) repeating step d) followed by step e) until determining in step e) that the sequence results in the bug;
   g) selecting a next to last file in the sequence during an initial selection and selecting a file immediately preceding a current selected file during a subsequent selection;
   h) excluding the selected file from the sequence;
   i) determining whether without the selected file the sequence results in the bug; and
   j) returning the file to the sequence in response to determining in step i) that the sequence does not result in the bug.

15. A bug location system comprising:
   at least one memory for storing a sequence of instructions conforming to the bug location method of claim 3 for locating a bug; and a processor coupled to receive the sequence of instructions from the memory, the processor having an input for receiving a sequence of files, and an output for supplying a signal indicating a minimal sequence of files which results in the bug in response to processing of the instructions and the sequence of files by the processor.

16. The bug location system of claim 15, wherein the input and output of the processor comprise a single port.

17. The bug location system of claim 15, wherein the received sequence of files have the bug, and wherein responsive to the instructions, the signal supplied by the processor indicates a minimal list which results in the bug.

18. The bug location system of claim 15, wherein the instructions instruct the processor to indicate a minimal number of the files which produce a bug when processed by the processor.

19. A computer-implemented bug location method for locating a bug resulting from processing a sequence of files, the bug location method using a computer executing a software program including the following steps:
   a) selecting a portion of the files to exclude from the sequence;
   b) excluding said portion of the files from the sequence;
   c) determining after step b) whether the sequence results in the bug;
   d) in response to determining that the sequence does not result in the bug, returning a portion of excluded files to the sequence;
   e) determining, after returning the portion in step d), whether the sequence results in the bug; and
   f) repeating step d) followed by step e) until a bug is determined to exist in the sequence.

20. A computer readable medium having contents which cause a computer bug location system to locate a bug resulting from processing a sequence of files by performing the following steps:
   a) selecting a portion of the files to exclude from the sequence;
   b) excluding said portion of the files from the sequence;
   c) determining after step b) whether the sequence results in the bug;
   d) in response to determining in step c) that the sequence does not result in the bug, returning a portion of excluded files to the sequence;
   e) determining, after returning the portion in step d), whether the sequence results in the bug; and
   f) repeating step d) followed by step e) until a bug is determined to result from the sequence.

21. A bug location system for locating a bug resulting from a sequence of files, the bug location system comprising:
   means for selecting a portion of the files to exclude from the sequence;
   means for excluding said portion of the files from the sequence;
   means for determining after excluding said portion of files from the sequence whether the sequence results in the bug; and
   means for performing the following steps a), b) and c), in response to determining in that the sequence does not result in the bug:
      a) returning a portion of excluded files to the sequence;
      b) determining after step a) whether the sequence results in the bug; and
      c) repeating step a) followed by step b) until a bug is determined to result from the sequence.

22. In a print emulating device, a method for locating bugs resulting from processing of a sequence of files, the method comprising the steps of:
   a) selecting a next to last file in the sequence during an initial selection and selecting a file immediately preceding a current selected file during a subsequent selection;
   b) excluding the selected file from the sequence;
   c) determining whether without the selected file the sequence results in the bug; and
   d) returning the file to the sequence in response to determining that without the selected file the sequence does not result in the bug.

23. The method of claim 22, wherein step a) is repeated until all but a first file of the sequence has been selected.

* * * * *